United States Patent
Watanabe et al.

(10) Patent No.: US 6,400,651 B1
(45) Date of Patent: Jun. 4, 2002

(54) COIL BLOCK PROTECTION STRUCTURE AND ELECTRONIC DEVICE HAVING COIL BLOCK PROTECTION STRUCTURE

(75) Inventors: Mamoru Watanabe; Shigeo Suzuki; Kenichi Nakajima, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/638,259

(22) Filed: Aug. 11, 2000

(30) Foreign Application Priority Data

Sep. 19, 1999 (JP) .......................................... 11-251609

(51) Int. Cl.$^7$ ........................... H02K 5/00; H02K 37/00
(52) U.S. Cl. ...................... 368/155; 368/160; 368/162; 368/168; 368/203; 368/204; 310/71; 310/179
(58) Field of Search ................... 368/80, 88, 155–157, 368/160–163, 168, 203, 204; 310/49 R, 71, 179, 194, 254

(56) References Cited

U.S. PATENT DOCUMENTS

| | | | | |
|---|---|---|---|---|
| 4,274,153 A | * | 6/1981 | Kume et al. | 368/80 |
| 4,305,056 A | * | 12/1981 | Mochida et al. | 336/178 |
| 4,862,432 A | * | 8/1989 | Hiraga et al. | 368/157 |
| 5,416,752 A | * | 5/1995 | Ikegami | 368/88 |
| 5,440,285 A | * | 8/1995 | Nakanishi et al. | 335/78 |
| 5,747,908 A | * | 5/1998 | Saneshige et al. | 310/254 |

OTHER PUBLICATIONS

Nakayama et al., Coil Block, Aug. 1991, JP403190107A, abstract.*
Nitta et al., Manufacturing of welding transformer for resistance welding, Mar. 1996, JP408069937A, abstract.*
Rotating fulcrum type polar electromagnet for relay—has coil frame simultaneously formed with core of coil block body where very thin insulation coating is applied on whole except at end, Apr. 1996, JP08111160A, abstract.*
Structure of EM switch—has insulated cork screw which is made of high heat resistance material provided between block part enclosed in insulated cover and insulated wall, Dec. 1997, JP09320399A, abstract.*
Sato, Production of bent coil block, Jan. 1981, JP356001743A, abstract.*
Nakayama, Construction of step motor for watch, Jun. 1979, JP354073675A, abstract.*

* cited by examiner

Primary Examiner—Diego Gutierrez
Assistant Examiner—Jeanne-Marguerite Goodwin
(74) Attorney, Agent, or Firm—Adams & Wilks

(57) ABSTRACT

An electronic device has a battery for storing electric power, an electronic circuit driven by electric power from the battery, and a coil block for generating a magnetic field in accordance with a signal from the electric circuit. A protective film is connected to the battery and is disposed over the coil block for protecting the coil block.

25 Claims, 2 Drawing Sheets

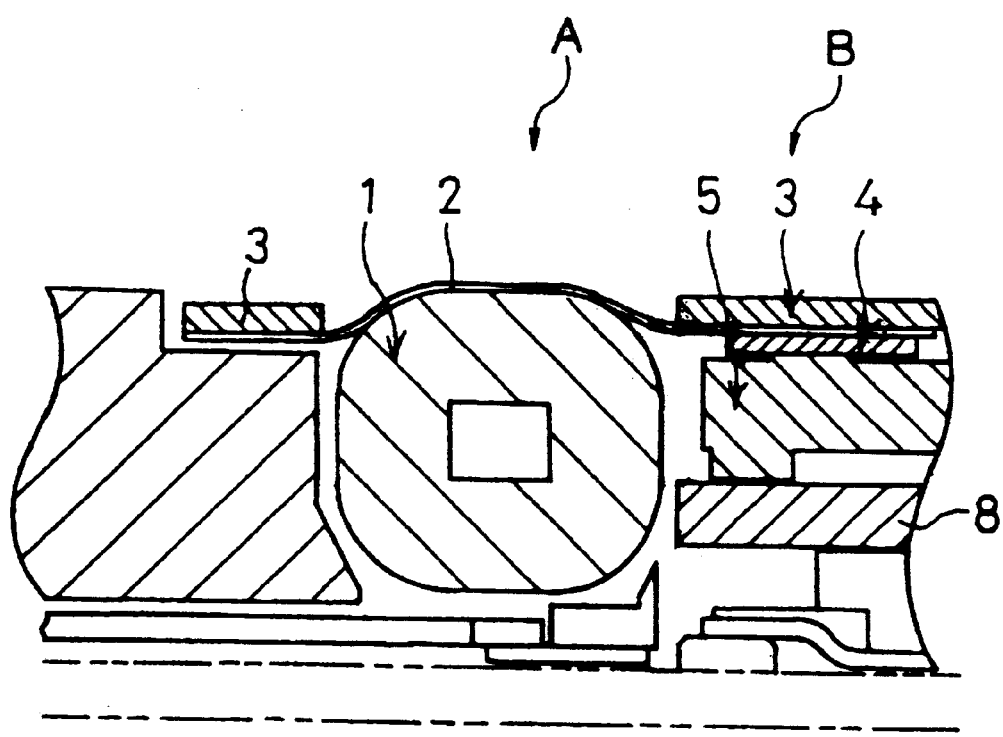

COIL BLOCK PROTECTION STRUCTURE AND ELECTRONIC DEVICE HAVING COIL BLOCK PROTECTION STRUCTURE

BACKGROUND OF THE INVENTION

1. Field of the Invention

The present invention relates to a coil block protection structure for an electronic device, and more particularly to a coil block protection structure for an electronic watch for covering a top surface of the coil block with a protective film for protecting the coil block.

2. Description of the Prior Art

In the conventional coil block protection structure for an electronic watch, there is adopted a protection structure in which a surface of the coil block is coated with insulating material such as resin to form a protection layer, or a protection structure in which a part other than the coil block, for example, an end portion of a gear train receiver made of insulating material such as resin is extended so as to cover the top surface of the coil block.

However, the above-described conventional coil block protection structure for an electronic watch has the following problems.

(1) In the case where the insulating material is coated on the top surface of the coil block to form the protection layer, the increase in the operating cost for the coating process and the increase in the tact time due to the quality control of the process, the optimum control or the like leads to the increase in the cost for the product.

(2) In the case where the parts other than the coil block (for example, a gear train receiver) are adapted to cover the top surface of the coil block to form the protection structure, it is impossible to sufficiently thin the thickness of the protection structure with the molded part that is formed so as to cover the top surface of the coil block. It is therefore impossible to effectively thin the thickness of a movement.

In order to overcome the above-noted defect, an object of the present invention is to provide an electronic watch in which the thickness of the coil block protection structure for the electronic watch is decreased while maintaining a sufficient strength without increasing the cost and only the thickness of the movement may be decreased.

SUMMARY OF THE INVENTION

According to the present invention, a protection structure for a coil block constituting a converter for an electronic device, such as an electronic watch, is constructed so as to be provided with a protective film for covering a top surface of the coil block and a clamping means for clamping the protective film.

In the invention, it is possible to form the film with a film for preventing the electric conduction.

In the invention, it is preferable that the thickness of the film be in the range of 0.025 mm to 0.2 mm.

BRIEF DESCRIPTION OF THE DRAWINGS

A preferred form of the present invention is illustrated in the accompanying drawings in which:

FIG. 2 is a cross-sectional view showing a coil block protection structure of the electronic watch exemplified in one embodiment of the present invention taken along the line 2—2 of FIG. 1.

DETAILED DESCRIPTION OF THE PREFERRED EMBODIMENTS

Figure 1:
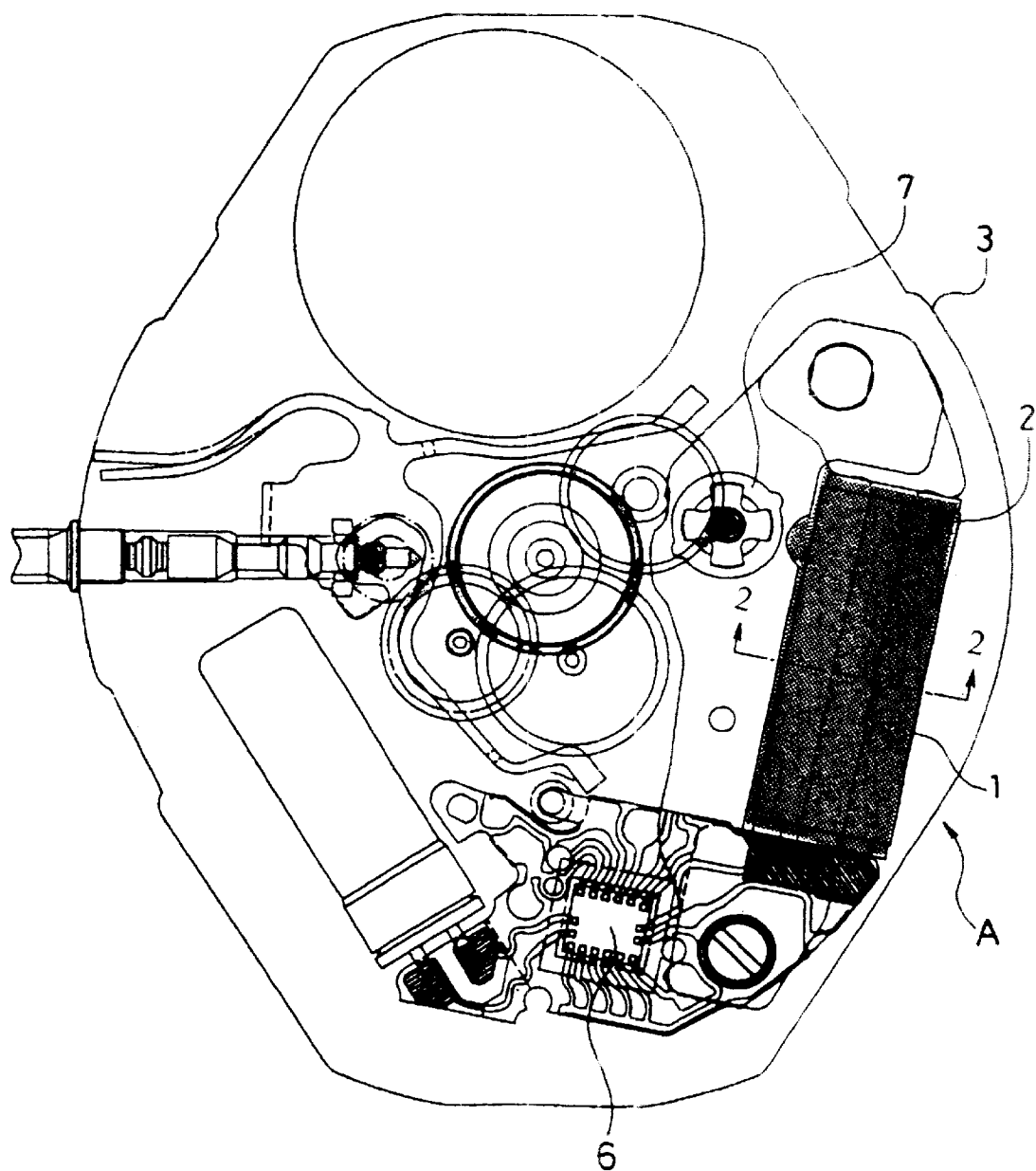
FIG. 1 is a schematic view showing an interior of an electronic watch exemplified in one embodiment of the present invention.

One embodiment of the present invention will now be described with reference to FIGS. 1 and 2. However, the present invention is not limited to the following embodiment of the present invention but may include other embodiments.

As shown in FIG. 1, the coil block 1 is one of components of a converter A for converting an electric signal from an electronic circuit block 6 to a rotational motion and serves to receive an electric signal generated by the electronic circuit block 6 and to generate a pulse magnetic field in a stator 8. Furthermore, this electronic watch is provided with a drive mechanism in which a rotor 7 is rotated by the pulse magnetic field to thereby operate a gear train assembled in a gear train receiver 5.

As shown in FIG. 2, a coil block protection structure for an electronic watch according to the present invention is provided with the coil block 1, a protective film 2 for coping freely with the shape of the top surface of the coil block 1 to coat it and to protect the coil block 1 and a clamping means B using, for example, a lower surface of a circuit pressure plate 3 that also serves as a battery plus terminal and a top surface of a battery minus terminal 4 as the clamping means B for clamping the film 2. Incidentally, in FIG. 2, for the purpose of simplifying understanding of the invention, only main parts are shown.

(FILM)

The requisite condition of the film 2 is to have a protection function of the coil block 1 that may prevent the damage of the coil within the coil block 1 even if the film comes into contact with the upper portion of the coil block 1 when the electronic watch is to be assembled or the movement is handled, and a function to electrically insulate both parts while the film 2 is inserted into these parts in the case where the parts constituting the clamping means B for retaining and clamping the film 2 are, for example, the circuit pressure plate 3 that also serves as the battery plus terminal and the battery minus terminal 4. Also, it is preferable that the film 2 is a film that is thin and light in weight and may be applied freely to the shape of the coil block 1.

It is possible to point out resin, rubber or the like as the material to meet the requisite condition and to select one out of these materials. For example, it is possible to point out a film such as polyethylene resin, polyimide resin, silicone-based resin, fluorine-based resin (Teflon resin or the like) or the like or to point out a film of synthetic rubber such as butadiene styrene rubber and fluorine-based rubber or a film of natural rubber or the like.

The thickness of the film 2 has to be thin so that the thickness of the coil block protection structure becomes thin as much as possible in the range that a coil block protection function having such a strength that the damage of the coil within the coil block 1 may be prevented without breaking the film 2 even if the film comes into contact with the top portion of the coil block 1, and a function of electrically insulating the circuit pressure plate 3 and the battery minus terminal 4 from each other in the case where the parts constituting the clamping means B for clamping and retaining the film 2 are, for example, the circuit pressure plate 3 and the battery minus terminal 4, are maintained. The range of the thickness of the film 2 that meets such a requisite condition may sufficiently fall within the range of about 0.025 mm to 0.2 mm. If the thickness of the film 2 is thinner than 0.025 mm, it is difficult to manufacture the film provided with such a requisite condition. Thus, this is not favorable. Also, if the thickness of the film 2 is thicker than 0.2 mm, the thickness of the protection structure of the coil block 1 becomes thick so that the effect of thinning the thickness of the movement is lowered considerably, and therefore, this is not favorable. Accordingly, it is preferable that the thickness of the film 2 is in the range of about 0.025 mm to 0.2 mm.

(FILM CLAMPING MEANS)

It is preferable that the film 2 is clamped by parts located in the vicinity of the coil block 1. As shown in FIG. 2, it is possible to point out as the positional requisite condition that is needed for the parts for clamping the film 2 to have a height that is flush with the top surface of the coil block 1 and to be close in the coil block 1 to thereby make it possible to stably hold the film 2. As the clamping portion provided with such a prerequisite condition, it is possible to, for example, point out the position between the lower surface of the circuit pressure plate 3 serving as the battery plus terminal and the top surface of the battery minus terminal 4 or the position between the lower surface of the battery minus terminal 4 and the top surface of the gear train receiver 5. Among these, in the case where the portion between the lower surface of the circuit pressure plate 3 and the top surface of the battery minus terminal 4 is used as the clamping portion, it is also possible to impart simultaneously the insulation property inherently needed to the portion between the circuit pressure plate 3 and the battery minus terminal 4 so that the protection structure of the coil block 1 according to the present invention may be compatible with the insulation property, to thereby thin the movement effectively. Accordingly, it is preferable that the clamping means B of the film 2 be formed between the lower surface of the circuit pressure plate 3 and the top surface of the battery minus terminal 4.

It is possible to use, as the holding means in the clamping portion of the film 2, either one or both of the adhesive holding means using the adhesives and the physical holding means by the physical contact without using the adhesives. In the case where the adhesive holding means is used, for example, the adhesives are applied to both surfaces of the film 2 so that it is possible to more firmly adhesively hold the top surface of the battery minus terminal 4 and the film 2 with the lower surface of the circuit pressure plate 3 to thereby provide a movement that is superior also in the shock-resistance. Further, as the adhesive holding means, it is possible to apply the adhesives only to the top surface of the film 2 and to adhesively hold the lower surface of the circuit pressure plate 3 with the top surface of the film 2. Otherwise, as the adhesive holding means, it is possible to apply the adhesives only to the portion of the film 2 that comes into contact with the clamping portion, and for example, it is possible to adopt a means for applying adhesives only to the portion of the film 2 that contacts with the top surface of the battery minus terminal 4 and/or the lower surface of the circuit pressure plate 3 to adhesively hold them.

It is possible to use well known adhesives as the adhesives for the adhesive holding means of the film 2. For instance, it is possible to use an epoxy-based adhesive or the like.

On the other hand, in the case where the physical holding means is used, since the adhesive applying process can be omitted, it is possible to provide an electronic watch with the cost suppressed to a good level. In this case, the film 2 is required to have characteristics having suitable rigidity such that it is not warped at the portion where it is not held by the clamping means B at its end portion and its lower surface is exposed. Both the holding means are suitably used in accordance with the needs such as the use, characteristics, cost required for the electronic watch.

Incidentally, in the drawing shown in FIG. 2, there is shown a structure ill which the clamping portion of the film 2 is formed on the right side of the coil block 1 and between the lower surface of the circuit pressure plate 3 serving as the battery plus terminal and the top surface of the battery minus terminal 4, and a structure is shown on the left side of the coil block 1 in which the terminal of the film 2 is not clamped because of the limit of the part arrangement within the converter A of the electronic watch but comes into contact with the lower surface of the circuit pressure plate 3 thus, the film 2 is not necessarily held by the clamping means B in its entire end portion, and at least part of the end portion of the film 2 may be held by the clamping means B. Furthermore, it is sufficient to use a structure that may stably hold the end portion by using the holding means.

As described above, according to the present invention, a protection structure for the coil block constituting the converter of the electronic watch is provided with a film for covering the top surface of this coil block and a clamping means for clamping this film, and therefore, it ensures the effect to make it possible to readily manufacture the coil block protection structure for the electronic watch without increasing the cost therefor.

Also, according to the present invention, in the case where the clamping portion for holding the film is constituted by two parts, and the two parts must be electrically insulated from each other, the film is formed of a film for preventing electric conduction, whereby the protection function of the coil block and the insulation function between the parts constituting the clamping portion are compatible with each other, and the coil block protection structure may be formed thin, which leads to a thinner structure for the movement Accordingly, the quality of design for the watch is enhanced.

Furthermore, according to the present invention, the thickness of the film is in the range of 0.025 mm to 0.2 mm so that it is possible to thin the movement while sufficiently holding the protection function of the coil block and the insulation function between the parts constituting the clamping portion of the film, resulting in provision of an electronic watch having an excellent design.

What is claimed is:

1. An electronic device comprising: a battery for storing electric power; an electronic circuit driven by electric power from the battery; a coil block for generating a magnetic field in accordance with a signal from the electric circuit; and a protective film connected to the battery and disposed over the coil block for protecting the coil block.

2. An electronic device according to claim 1; wherein the battery has a positive terminal and a negative terminal; and wherein the protective film has a connecting portion clamped between the positive and negative terminals of the battery.

3. An electronic device according to claim 2; wherein the protective film is made of a non-conductive material.

4. An electronic device according to claim 3; wherein the protective film has a thickness in the range of 0.025 mm to 0.2 mm.

5. An electronic device according to claim 4; wherein the non-conductive material comprises a non-conductive resin material.

6. An electronic device according to claim 4; wherein the non-conductive material comprises rubber.

7. An electronic device according to claim 1; wherein the protective film has a thickness in the range of 0.025 mm to 0.2 mm.

8. An electronic device according to claim 1; wherein the protective film comprises a thin sheet of material.

9. An electronic device according to claim 8; wherein the protective film hag a thickness in the range of 0.025 mm to 0.2 mm.

10. An electronic device according to claim 1; wherein the protective film is non-tubular-shaped.

11. An electronic device according to claim 1; wherein the battery has a positive terminal and a negative terminal; and wherein the protective film comprises a thin sheet of non-conductive material having a connecting portion connected to the battery for providing electrical insulation between the positive and negative terminals of the battery.

12. An electronic watch comprising: a rotor mounted for undergoing rotation; a gear train driven by rotation of the rotor; a battery for storing electric power and having a positive terminal and a negative terminal; an electronic circuit driven by electric power from the battery; a coil block for generating a pulse magnetic field in accordance with a signal from the electric circuit to rotate the rotor; and a protective film disposed over the coil block for protecting the coil block, the protective film having a connecting portion disposed between and connected to the positive and negative terminals of the battery.

13. An electronic watch according to claim 12; wherein the protective film comprises a sheet of non-conductive material for providing electrical insulation between the positive and negative terminals of the battery.

14. An electronic watch according to claim 12; wherein the protective film comprises a sheet of non-conductive materials.

15. An electronic watch according to claim 14; wherein the sheet of non-conductive material comprises a resin material.

16. An electronic watch according to claim 15; wherein the sheet of non-conductive material has a thickness in the range of 0.025 mm to 0.2 mm.

17. An electronic watch according to claim 14; wherein the sheet of non-conductive material comprises a rubber material.

18. An electronic watch according to claim 17; wherein the sheet of non-conductive material has a thickness in the range of 0.025 mm to 0.2 mm.

19. An electronic watch according to claim 12; wherein the protective film comprises a sheet of a non-conductive resin material having a thickness in the range of 0.025 mm to 0.2 mm.

20. An electronic watch according to claim 12; further comprising a pressure plate serving as the positive terminal of the battery and connected to the negative terminal of the battery with the connection portion of the coil block clamped therebetween.

21. An electronic watch according to claim 12; further comprising an adhesive for adhering the connecting portion of the coil block to the positive and negative terminals of the battery.

22. An electronic device comprising: a battery for storing electric power; an electronic circuit driven by electric power from the battery; a coil block for generating a magnetic field in accordance with a signal from the electric circuit; and a thin sheet of non-conductive material disposed over a surface portion of the coil block for protecting the coil block, the thin sheet of non-conductive material has a connecting portion connected to the battery for providing electrical insulation between positive and negative terminals of the battery.

23. An electronic device according to claim 22; wherein the thin sheet of non-conductive material has a thickness in the range of 0.025 mm to 0.2 mm.

24. An electronic device according to claim 23; wherein the sheet of non-conductive material comprises a resin material.

25. An electronic device according to claim 23; wherein the sheet of non-conductive material comprises a rubber material.

* * * * *